(12) United States Patent
Minamimoto

(10) Patent No.: US 9,442,841 B2
(45) Date of Patent: Sep. 13, 2016

(54) SEMICONDUCTOR MEMORY DEVICE AND METHOD FOR LOGGING MONITORED EVENTS INTO A BUFFER

(71) Applicant: Kabushiki Kaisha Toshiba, Tokyo (JP)

(72) Inventor: Takeyuki Minamimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 13/787,753

(22) Filed: Mar. 6, 2013

(65) Prior Publication Data

US 2013/0282961 A1    Oct. 24, 2013

(30) Foreign Application Priority Data

Apr. 19, 2012    (JP) ................. 2012-095580

(51) Int. Cl.
*G06F 12/02* (2006.01)
*G06F 11/34* (2006.01)

(52) U.S. Cl.
CPC ....... *G06F 12/0246* (2013.01); *G06F 11/3476* (2013.01); *G06F 2201/86* (2013.01); *G06F 2212/1032* (2013.01); *G06F 2212/7202* (2013.01); *G06F 2212/7203* (2013.01)

(58) Field of Classification Search
CPC .......... G06F 12/0246; G06F 11/3476; G06F 2201/86; G06F 2212/1032; G06F 2212/7203; G06F 2212/7202
USPC ........... 711/103, 161, 162, E12.008; 714/20, 714/723, 763, E11.025
See application file for complete search history.

(56) References Cited

U.S. PATENT DOCUMENTS

| | | | |
|---|---|---|---|
| 6,148,365 A * | 11/2000 | Buer | 711/110 |
| 6,493,656 B1 * | 12/2002 | Houston et al. | 702/187 |
| 6,851,015 B2 * | 2/2005 | Akahane et al. | 711/103 |
| 2004/0139368 A1 * | 7/2004 | Austen et al. | 714/20 |
| 2006/0150015 A1 * | 7/2006 | Kondajeri et al. | 714/23 |
| 2010/0031094 A1 * | 2/2010 | Komagome | 714/48 |
| 2012/0144249 A1 * | 6/2012 | Franceschini et al. | 714/54 |

FOREIGN PATENT DOCUMENTS

| | | |
|---|---|---|
| JP | 11-282758 | 10/1999 |
| JP | 2001-125809 | 5/2001 |
| JP | 2006-178537 | 7/2006 |

* cited by examiner

*Primary Examiner* — Arpan P. Savla
(74) *Attorney, Agent, or Firm* — Patterson & Sheridan, LLP

(57) ABSTRACT

A semiconductor memory device includes a nonvolatile semiconductor memory in which writing is carried out at a page unit and erasing is carried out at a block unit larger than the page unit, and a controller for transferring data between a host device and the nonvolatile semiconductor memory. The controller includes a log-management section that is configured to: (i) record a page unit of log data in a buffer area each time a monitored event (e.g., error) occurs, the buffer area being partitioned into a plurality of pages and the page unit of log data is recorded in a designated page of the buffer area, and (ii) prior to recording the page unit of log data in the designated page, copy part of the designated page to another page of the buffer area.

14 Claims, 17 Drawing Sheets

INITIAL STATE

WHEN A FIRST ERROR OCCURS

WHEN A SECOND ERROR OCCURS
FIRST HALF

SECOND HALF

WHEN A 251ST ERROR OCCURS
FIRST HALF

SECOND HALF

Fig. 10

INITIAL STATE

ERROR LOG MANAGEMENT INFORMATION 23

| ARRANGEMENT INFORMATION OF BF0-19 | (INVALID) |
|---|---|
| ARRANGEMENT INFORMATION OF BF20-39 | (INVALID) |
| ⋮ | ⋮ |
| ARRANGEMENT INFORMATION OF BF220-239 | (INVALID) |
| ARRANGEMENT INFORMATION OF BF240-249 & THE LATEST LOG AND LOG NUMBER | PAGE ADDRESS = 0 |

23d

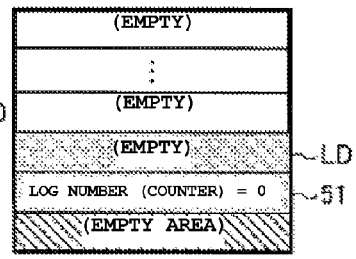

Address0

Fig. 11

WHEN A FIRST ERROR OCCURS

ERROR LOG MANAGEMENT INFORMATION 23

| ARRANGEMENT INFORMATION OF BF0-19 | (INVALID) |
|---|---|
| ARRANGEMENT INFORMATION OF BF20-39 | (INVALID) |
| ⋮ | ⋮ |
| ARRANGEMENT INFORMATION OF BF220-239 | (INVALID) |
| ARRANGEMENT INFORMATION OF BF240-249 & THE LATEST LOG AND LOG NUMBER | PAGE ADDRESS = 1 |

23d

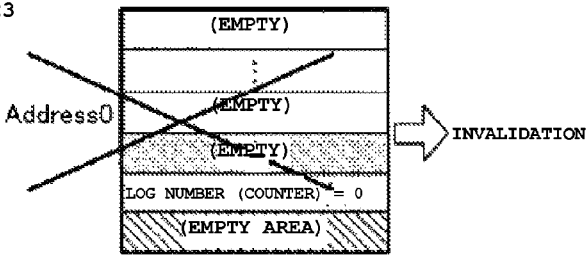

Address0 → INVALIDATION

Address1

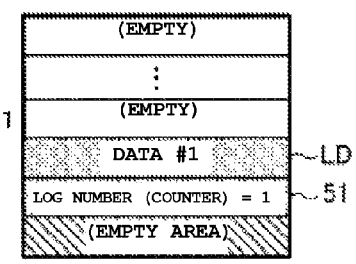

WHEN A SECOND ERROR OCCURS

FIRST HALF

SECOND HALF

WHEN A 21ST ERROR OCCURS
FIRST HALF

SECOND HALF

WHEN A FIRST ERROR OCCURS

WHEN A SECOND ERROR OCCURS

SEMICONDUCTOR MEMORY DEVICE AND METHOD FOR LOGGING MONITORED EVENTS INTO A BUFFER

CROSS-REFERENCE TO RELATED APPLICATION

This application is based upon and claims the benefit of priority from Japanese Patent Application No. 2012-095580, filed Apr. 19, 2012, the entire contents of which are incorporated herein by reference.

FIELD

Embodiments described herein relate to a semiconductor memory device that is provided with a nonvolatile semiconductor memory and its control method.

BACKGROUND

In many storage devices such as SSDs (solid state drives), a log of management information data is stored in nonvolatile semiconductor memory, and each time an event being monitored occurs, the log is updated. Usually, the log includes a data part and an indicator part for identifying the latest data. It is necessary for the data part and the indicator part not to be mismatched, even if an unexpected power-off occurs.

DESCRIPTION OF THE DRAWINGS

FIG. 10 shows the initial state of the ring buffer shown in FIG. 9.

FIG. 11 shows the state when a 1st error occurs in the ring buffer shown in FIG. 9.

DETAILED DESCRIPTION

Embodiments of the present disclosure provide a semiconductor memory device that accumulates and efficiently stores a log in a nonvolatile semiconductor memory, controls the log without causing mismatching of the data section and the indicator section, even if an unexpected power outage occurs, and can shorten the starting time.

In general, a detail description according to one embodiment of the semiconductor memory device and the control method of its embodiments will be explained in detail with reference to the attached figures. Here, the present disclosure is not limited by these embodiments.

A semiconductor memory device according to an embodiment includes a nonvolatile semiconductor memory in which writing is carried out at a page unit and erasing is carried out at a block unit larger than the page unit, and a controller for transferring data between a host device and the nonvolatile semiconductor memory. The controller includes a log-management section that is configured to: (i) record a page unit of log data in a buffer area each time a monitored event (e.g., error) occurs, the buffer area being partitioned into a plurality of pages and the page unit of log data is recorded in a designated page of the buffer area, and (ii) prior to recording the page unit of log data in the designated page, copy part of the designated page to another page of the buffer area.

First Embodiment

Figure 1:
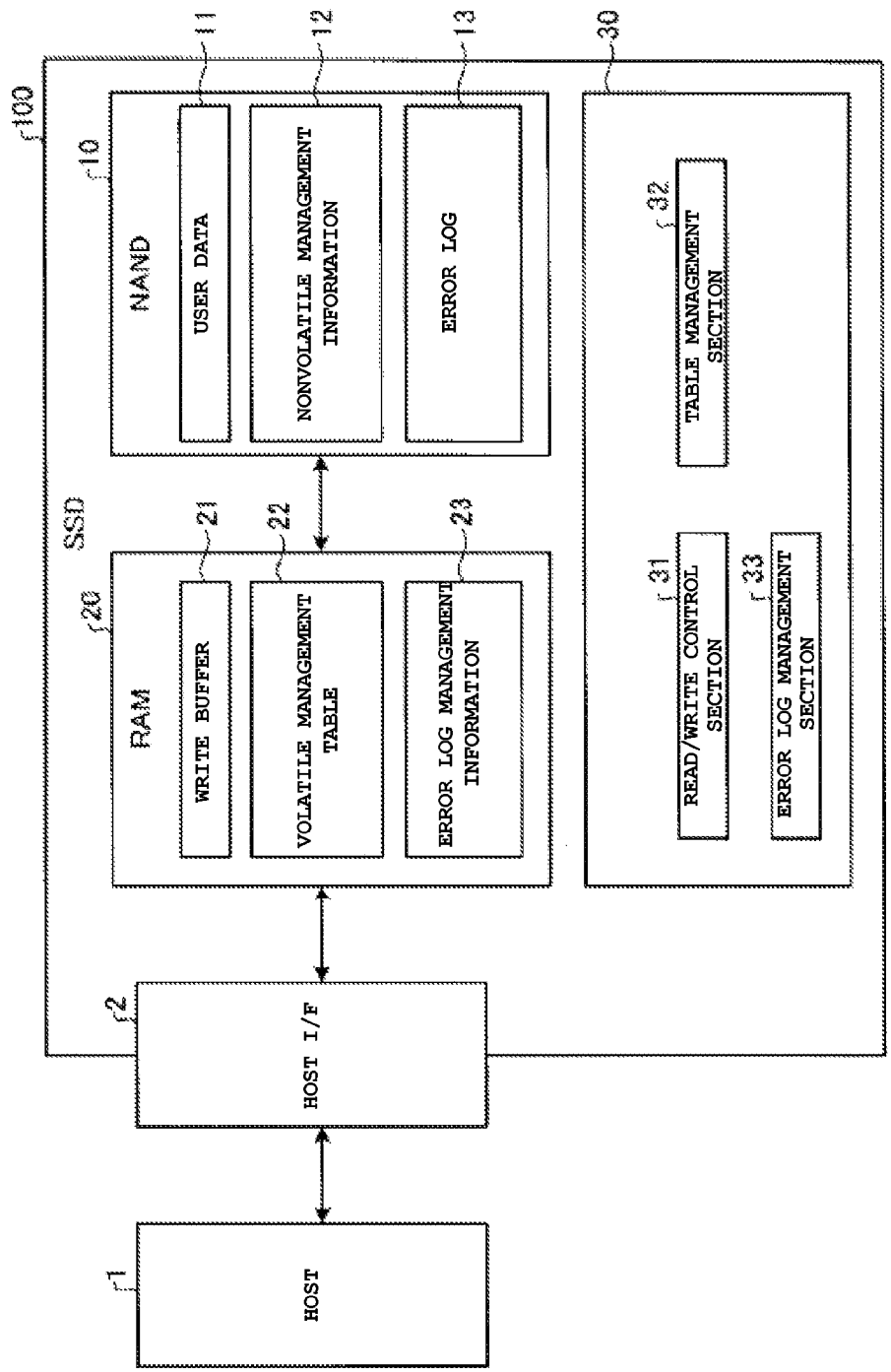
FIG. 1 is a block diagram showing one example of an SSD.

FIG. 1 is a block diagram showing an SSD (solid state drive) 100 as an example of the semiconductor memory device. The SSD 100 is connected to a host device (hereinafter abbreviated to a host) 1 such as a personal computer or CPU via a host interface 2 such as an ATA interface (ATA I/F) and functions as an external memory device of the host 1. The host 1, for example, is a CPU of an image-pickup device such as personal computer, still camera, or video camera. The SSD 100 is provided with a host interface 2, an NAND-type flash memory (hereinafter abbreviated to an NAND flash) 10 as a nonvolatile semiconductor memory, a RAM 20 as a volatile semiconductor memory that enables higher-speed access than the NAND flash 10, and a controller 30.

The RAM 20 includes a storage area as a write buffer 21 that temporarily stores data when the data from the host 1 are written into the NAND flash 10, a storage area that stores and updates management information for managing the SSD 100, and a work area that temporarily stores data read out of the NAND flash 10. The management information for managing the SSD 100 includes a volatile management table 22 as a management table for managing the SSD 100 and the error log management information 23. In the volatile management table 22, various kinds of information other than the error log management information 23 are managed. The management information, which is managed in the volatile management table 22, includes logical transformation information showing the relationship between a logical address, which is used in the host 1, and a storage position (physical address) on the NAND flash 10 in which data are stored, block use/non-use information showing whether each block of the NAND flash 10 is in use, bad block information for identifying a bad block which cannot be used as a storage area because of a large number of errors, etc. The volatile management table 22 and the error log management information 23 are developed (loaded) when the nonvolatile management information 12, which is stored in the NAND flash 10, is started, etc., as the RAM 20, volatile DRAM, SRAM, etc., are adopted. The error log management information 23 will be described later.

The NAND flash 10 has a memory cell array in which multiple memory cells are arranged in a matrix form, and each memory cell can store a multi-value by using an upper page and a lower page. The NAND flash 10 includes multiple memory chips, and each memory chip is formed by arranging multiple physical blocks each being a unit of data erasure. In addition, the NAND flash 10 writes data and reads data for each page. In other words, the write unit and the read unit of data of the NAND flash 10 is a page. The block includes multiple pages.

In the NAND flash 10, a user data-storage section 11 for storing user data input from the host 1 and various kinds of management information for managing the SSD 100 are stored. The management information, which is stored in the NAND flash 10, includes the volatile management table 22, the nonvolatile management information 12 as a backup of the error log management information 23, the error log 13, etc. The error log 13 will be described later.

The controller 30 has a read/write control section 31, a table management section 32, and an error log management section 33. If a read command and a read address are input from the host 1, then the read/write control section 31 reads data corresponding to the read address out of the write buffer 21 or the NAND flash 10 with reference to the volatile management table 22 and transmits the read data to the host 1. If a write command, a write address, and write data are input from the host 1, the read/write control section 31 writes the write data into the write buffer 21. If the write buffer 21 has no empty area, the data are flushed from the write buffer 21 with reference to the volatile management table 22 and written into the NAND flash 10. Next, the write data are written into the empty area of the write buffer 21 generated by the flush of the data. The table management section 32 updates the volatile management table 22 in accordance with data writing into the write buffer 21 and data writing into the NAND flash 10.

In the SSD 100, for example, in the case where the data of the same LBA are overwritten, the read/write control section 31 implements the following process. It is assumed that valid data with a block size are stored at a logical address A1, and a block B1 is used as a storage area. In case a command for overwriting with updated data of a block size of the logical address A1 is received from the host 1, one free block (assumed as a block B2) and containing no valid data in the block (e.g., erased and unused) is secured, and data received from the host 1 are written into the free block. Next, management information for relating the logical address A1 and the block B2 is updated. As a result, the block B2 becomes an active block that has been allocated and containing valid data in the block, and the data stored in the block B1 are invalid, turning the block B1 into a free block.

Therefore, in the SSD 100, even for data of the same logical address A1, the block that is used as an actual recording area is changed for each write. Here, in writing the updated data of a block size, the write-destination block must be changed; however, in writing the updated data smaller than the block size, the updated data are sometimes written into the same block. For example, in case page data smaller than the block size are updated, the old page data at the same logical address are invalidated in the block, and the latest page data newly written are managed as a valid page. If all the data in the block are invalidated, then the block is released as a free block.

The table management section 32 implements a process for transferring the nonvolatile management information 12 stored in the NAND flash 10 as the volatile management table 22 and the error log management information 23 to the RAM 20 when the nonvolatile management information 12 is started and a process for storing the nonvolatile management table 22 and the error log management information 23 on the RAM 20 as the nonvolatile management information 12 in the NAND flash 10 when a periodic or normal power-off sequence occurs, etc.

In the case that an error such as write error, erasure error, or read error occurs, the error log management section 33 writes the error log 13 into the NAND flash 10 with reference to the error log management information 23 on the RAM 20 and updates the error log management information 23 on the RAM 20 along with writing of the error log. The error log 13 includes a ring buffer that can accumulate and store a prescribed number M of error log data. The ring buffer includes a data section for accumulating and recording a prescribed number of error log data and an indicator section for identifying the latest error log data. The operation of the error log management section 33 will be described later.

Figure 2:
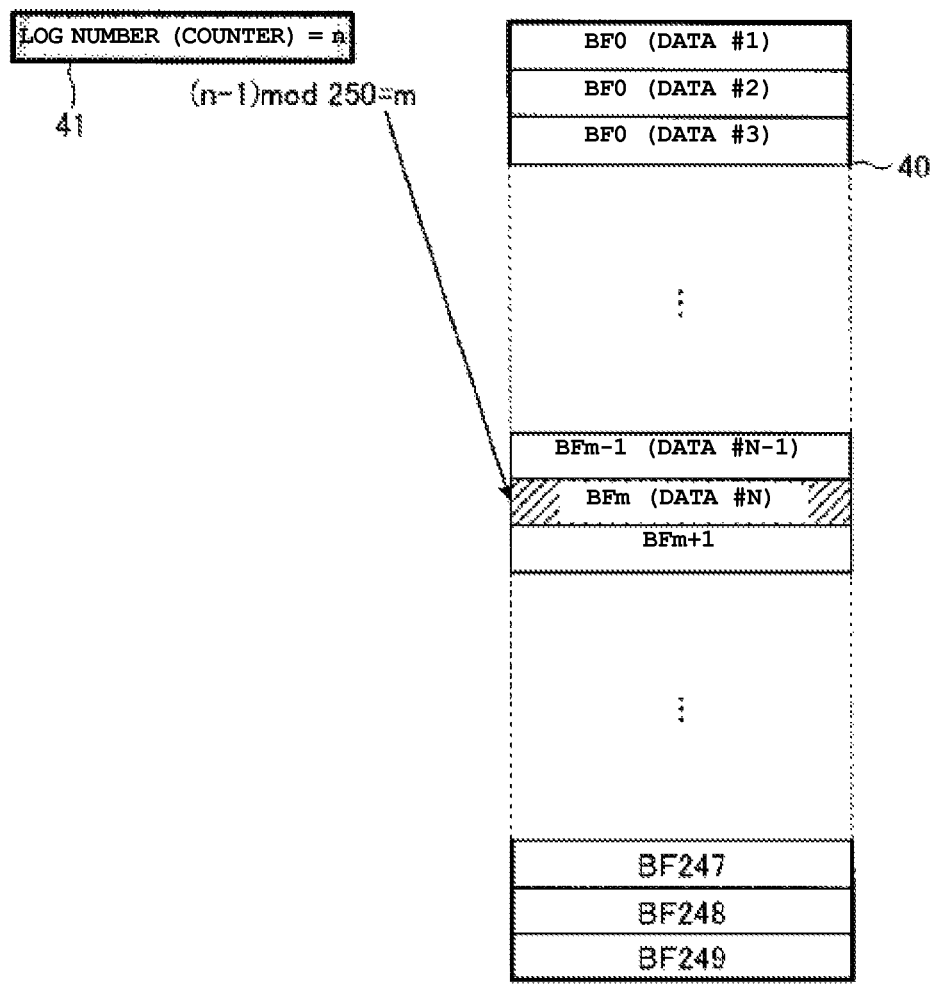
FIG. 2 shows a logical diagram of a ring buffer for recording an error log.

FIG. 2 shows a logical diagram of a ring buffer 40 for accumulating and recording the error log 13 in the NAND flash 10. The ring buffer 40 can record M pieces (250 pieces in this embodiment) of log data at maximum and has M (=250) pieces of buffer area (hereinafter simply called buffers: buffer BF0 to buffer BF249). In the buffer BF0 to the buffer BF249, log data are recorded in order of the time of error occurrence. The ring buffer 40 manages the latest log number n using an indicator 41. The log number, which is managed by the indicator 41, is not a relative value that is managed in a range of "1" to "250," and even if the log number exceeds "250," the value is managed as an absolute value that is counted up.

Log data of the log number "X" are indicated by data #X. Data #1 are written into the buffer BF0, data #2 are written into the buffer BF1, . . . , and data #250 are written into the buffer BF249. In addition, data #251 are written into the buffer BF0, . . . , and data #501 are written into the buffer BF0. In other words, data #n are written into the buffer BFm according to m=(n−1) mod 250, where mod represents the remainder, and m is the remainder obtained by dividing n−1 by the number of the buffer (=250).

Figure 3:
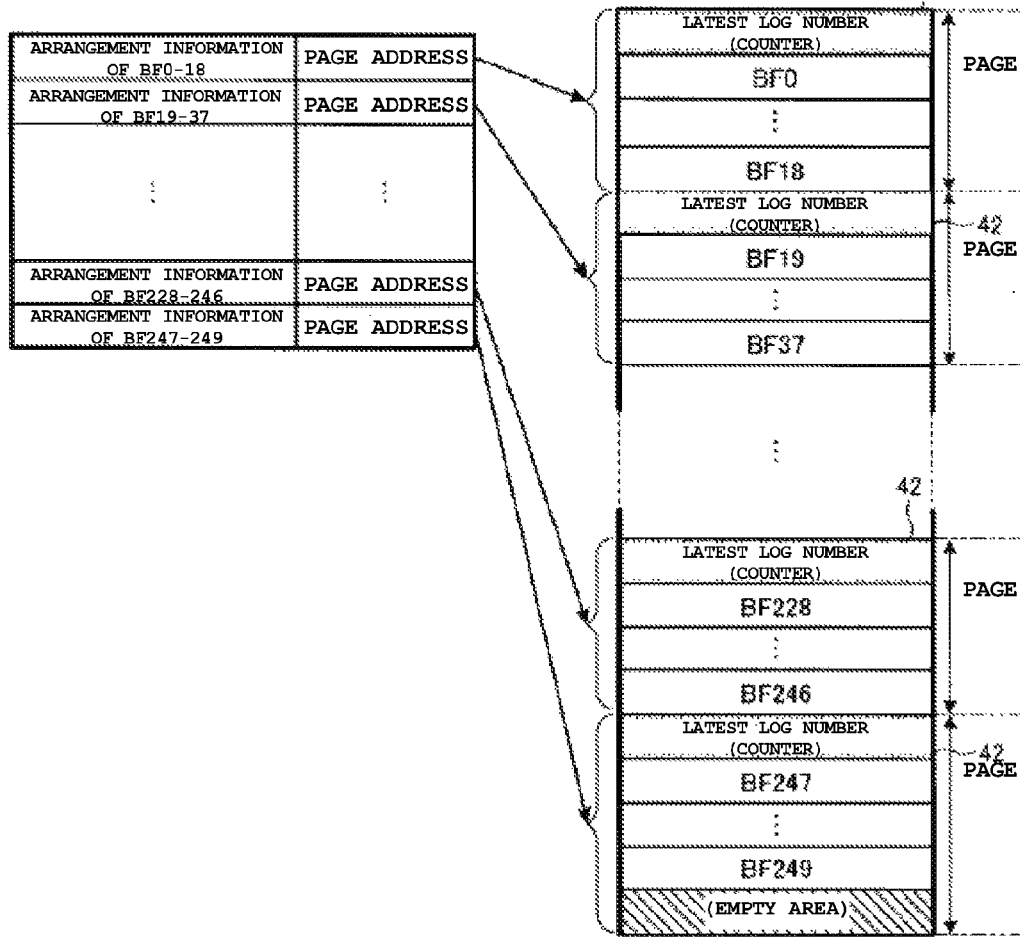
FIG. 3 shows a physical storage arrangement of an error log in a comparative example.

FIG. 3 shows a physical storage arrangement of an error log in a comparative example. In FIG. 3, 250 pieces of log data at maximum can also be recorded. As mentioned above, writing to the NAND flash 10 is performed in units of a page. Here, it is assumed that one page has a capacity that can record 20 pieces of log data or indicator information. In the comparative example, the log data, which are recorded in the buffers BF0 to BF249, and the indicator information 42 for managing the latest log number n are recorded in the same page so that even if an unexpected power-off occurs during the log recording, the data and the indicator are prevented from being mismatched. In other words, in a system for recording the log data and the indicator in separate pages, if an unexpected power-off occurs after writing one of them, there is a possibility that mismatching occurs between the data and the indicator.

In the comparative example, although a page originally has a capacity capable of recording 20 pieces of log data, to record the indicator information 42 at the head of each page, only 19 pieces of log data can be recorded in each page. In the comparative example, each page address (block number+page number) at which log data and indicator are recorded is managed by the error log management information 25 that is managed by the RAM 23. In the NAND flash 10, because writing several times into the same page is impossible, it is always necessary to record new log data and an indicator into a new page.

For example, in the case where log data of log number "1" are recorded in the buffer BF0, the log number "1" is recorded as the indicator information 42 at the head of a certain page (for example, a page B1 of the block A1), and the log data of the log number "1" are recorded in the buffer BF0 after the indicator information 42. The arrangement information of BF0-18 of the error log management information 25 is then updated to "the page B1 of the block A1."

When log data of log number "2" are recorded in the buffer BF1, a page (for example, a page B2 of the block A1) different from the previously used page (the page B1 of the block A1) is prepared, the log number "2" is recorded as the indicator information 42 at the head of the page, the log data of the log number "1" are recorded in the buffer BF0 after the indicator information, and the log data of the log number "2" are recorded in the buffer BF1. The arrangement information of BF0-18 of the error log management information 25 is then updated to "the page B2 of the block A1." Because the page (the page B1 of the block A1) in which the log data and the indicator information of the log number "1" have been recorded is removed from the management of the error log management information 25, it is regarded as an invalid page.

Through repetition of this process, the log number "19" is recorded as the indicator information 42 at the head of a certain page (for example, assumed as the page B10 of the block A2), and the log data of the log number "1" to the log number "19" are recorded in the buffer BF0 to the buffer BF18 after the indicator information 42. In this state, the page B10 of the block A2 is recorded in the entry of the arrangement information of BF0-18 of the error log management information 25. Because the storage area of this page is filled with 19 pieces of log data and one indicator information 42, this page is stored as it is as a storage page of the log data of the log number "1" to the log number "19" until the log data of the log number "251" are recorded later.

Next, through the repetition of a similar process, 19 pieces of log data and one indicator information 42 are recorded in 14 pieces of pages until 250 pieces of log are accumulated. When the log data of the log number "251" are recorded, a new page (assumed as a page B9 of the block A3) is prepared, and the log data of the log number "251" are recorded as the indicator information 42 at the head of the page, and log data of the log umber "251" are recorded in the buffer BF0 after the indicator information 42, and the log data of the log number "2" to the log number "19" are recorded in the buffer BF1 to the buffer BF18. The entry of the arrangement information of BF0-18 of the error log management information 25 is updated to "the page B9 of the block A3."

In the comparative example, to avoid the mismatch of the log data and the indicator of the ring buffer, the indicator information 42 is arranged in all of the pages in which the log data are recorded. In this arrangement, because the log data and the indicator 42 of the ring buffer can be simultaneously written, no mismatch occurs even when an unexpected power-off occurs. However, because the area of the indicator 42 is required for each page, in the case of a ring buffer that can record 250 pieces of log data, if 20 pieces of log data or indicator can be recorded in one page, then 250/(20−1)=13.15, which would require 14 pieces of pages. In the case that the indicator information is not arranged in each page, then 250/20=12.5, and thus the ring buffer would require 13 pieces of pages. Therefore, in the comparative example, compared with the case where the indicator information is not arranged in each page, there is a possibility that one or more extra pages are required to generate the ring buffer.

In addition, as mentioned above, the indicator information is managed in a pattern in which it is set as an absolute value by using a counter format, and the remainder is obtained by dividing the indicator information by the number of buffers (=250) to indicate the offset position (buffer position) of the ring buffer. In the comparative example, after a power input the error log management information 25 is read out of the NAND flash 10 and written into the RAM 20, each page on the NAND flash 10 constituting the ring buffer is discriminated by using the error log management information 25 of the RAM 20, and the indicator information is read out of each page. Moreover, in the comparative example, the indicator information read out of each page is compared, and a process for searching for the latest indicator with the maximum value as an indicator value is required, lengthening the initialization processing time after a power input to the storage device.

Accordingly, in this embodiment, the indicator information is recorded in a remainder area of the page at the tail of the ring buffer, only log data are recorded in the other pages constituting the ring buffer, and the indicator information is not recorded in the other pages. In other words, in this embodiment, the indicator information is recorded only in the page at the tail end of the ring buffer. Therefore, the number of page can be reduced compared with the comparative example, and thus the log data can be stored efficiently in the NAND flash 10 using a smaller storage area. In addition, because only one indicator information may be read out to detect the latest data, the initialization-processing time (starting time) after a power input can be shortened.

Moreover, in this embodiment, an area where the latest log data LD (latest data) and an area where the latest indicator 51 is recorded are installed in a remainder area of the page at the tail of the ring buffer. Next, when an error occurs, a recording operation of the error log is divided into the first half-process and the second half-process. In the first half-process, the log data LD at the time of the error occurrence are copied in a prescribed buffer corresponding to the log number in the ring buffer from the remainder area of the page at the tail of the ring buffer, and in the second half-process, the indicator 51 in the remainder area of the page at the tail of the ring buffer and the latest log data area LD are simultaneously updated according to the current log. Therefore, the latest indicator information 51 and the latest log data LD are simultaneously recorded in the same page, and thus the log can be managed without causing mismatching in the log data LD and the indicator, even if the unexpected power-off occurs.

Figure 4:
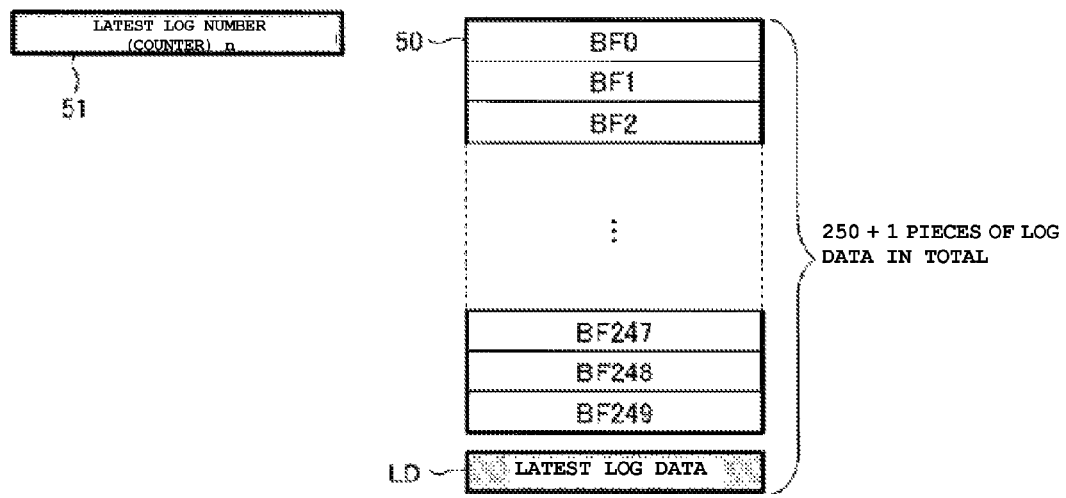
FIG. 4 shows a logical diagram of a ring buffer for recording an error log according to a first embodiment.

FIG. 4 shows a logical diagram of a ring buffer 50 for recording the error log 13 by the NAND flash 10 in this embodiment. In the ring buffer 50, 250 pieces of log data at maximum can be recorded by the buffer BF0 to the buffer BF249, and the latest log number n is managed by the indicator 51. Even if the log number, which is managed by the indicator 51, exceeds "250," the value is managed because it is an absolute value that is counted up. In this embodiment, the area where the latest log data LD are managed is installed apart from an area where the buffer BF0 to the buffer BF249 including the ring buffer 50 are managed. In other words, the area where the latest log data is recorded is redundantly managed in the buffer BF0 to the buffer BF249 and the latest log data area LD. In addition, the area where the indicator 51 is stored is an area where it can be written at the same time of the latest log data LD; that is, it is installed in the same page, and the indicator 51 and the latest log data LD are simultaneously updated.

Figure 5:
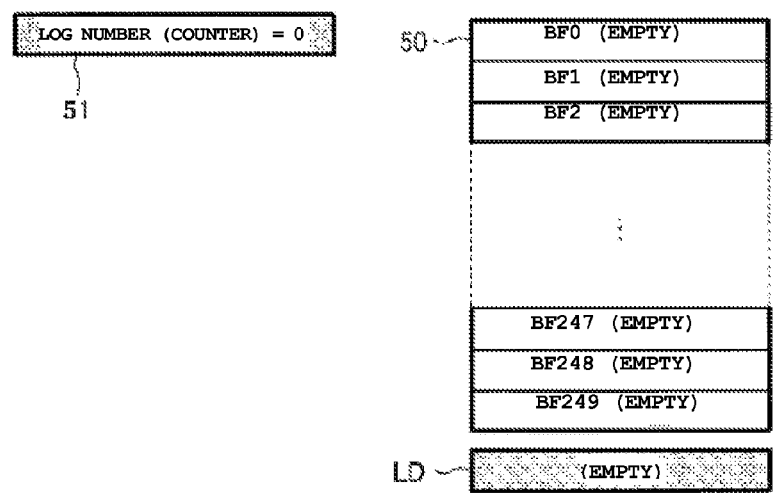
FIG. 5 shows the initial state of the ring buffer shown in FIG. 4.
Figure 6:
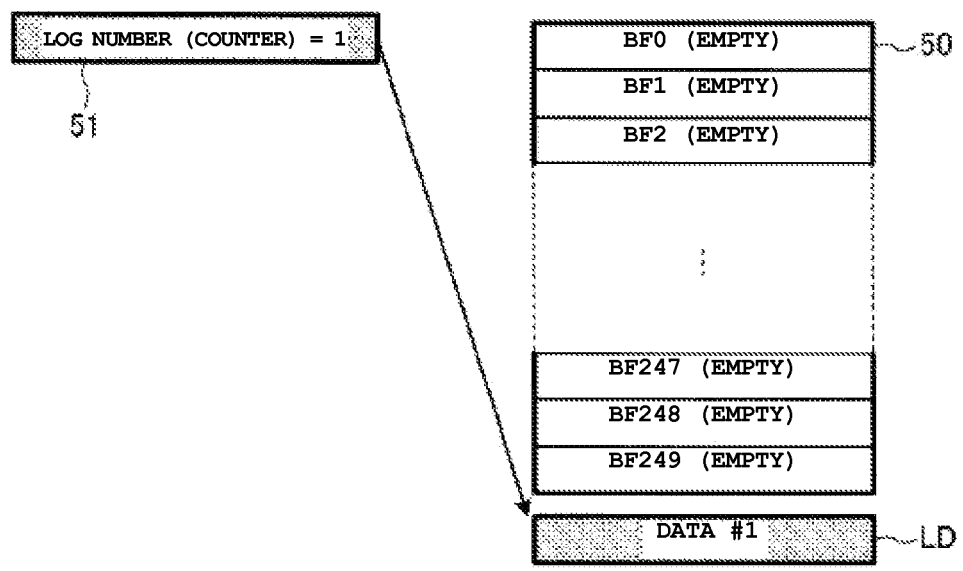
FIG. 6 shows the state when a 1st error occurs in the ring buffer shown in FIG. 4.

FIG. 5 shows the initial state of the error log 13 of the logical diagram. The log number of the indicator 51 is an initial value (=0), and no log data are recorded in the buffer BF0 to the buffer BF249 or the latest log data area LD including the ring buffer 50. FIG. 6 shows a recording operation of the first log data when the first error occurs. The log number of the indicator 51 is updated to "1," and the log data (data #1) of the log number "1" to be recorded in the buffer area BF0 are recorded in the latest log data area LD. In this state, the data #1 of the latest log data area LD and the data of the buffer area BF0 are not matched.

Figure 7A:
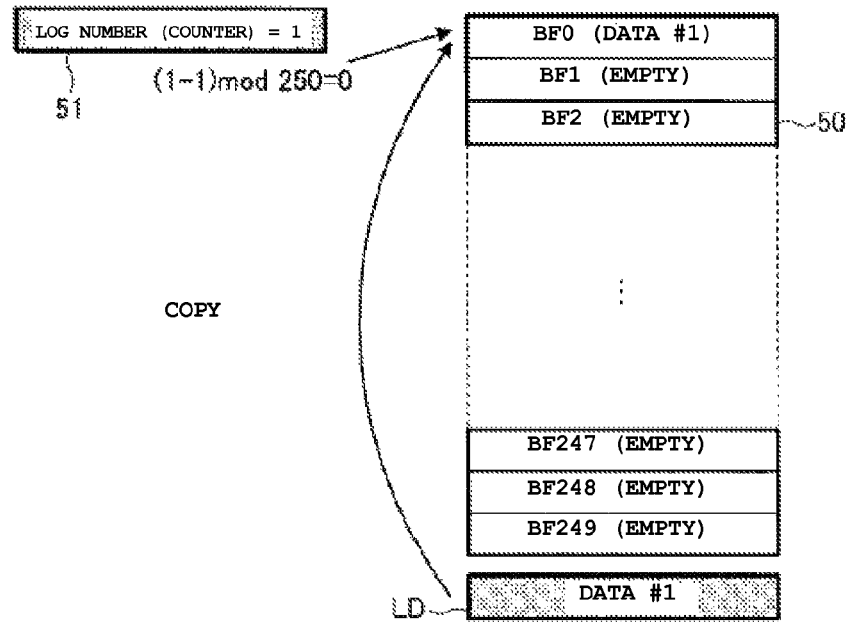
FIGS. 7A and 7B show the state when a 2nd error occurs in the ring buffer shown in FIG. 4.
Figure 7B:
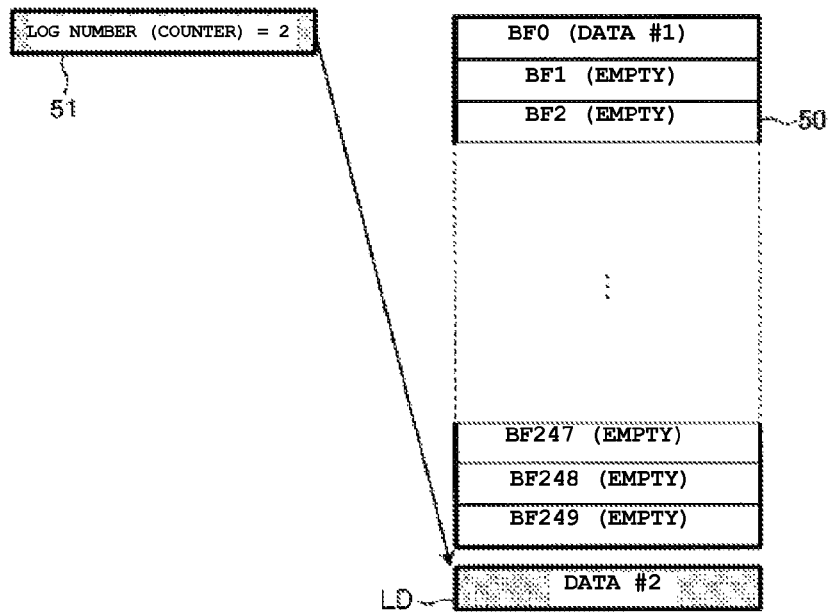

FIGS. 7A and 7B show a recording operation of the second log data when the second error occurs. The recording operation of the second log data is divided into the first half-process, shown in FIG. 7A, and the second half-process, shown in FIG. 7B. As shown in FIG. 7A, in the first half-process, the data #1 recorded in the latest log data area LD are copied in the buffer area BF0 of the ring buffer 50. After this copy, the indicator information 51 in which the log number "1" has been recorded, the log data of the buffer area BF0 of the ring buffer 50, and the log data of the latest log data area LD are in a matched state.

In the second half-process, shown in FIG. 7B, the indicator 51 and the latest log data LD are simultaneously updated by the second log. In other words, the log number of the indicator 51 is updated to "2," and the log data (data #2) of the log number "2" to be recorded in the buffer area BF1 are recorded in the latest log data area LD.

Figure 8A:
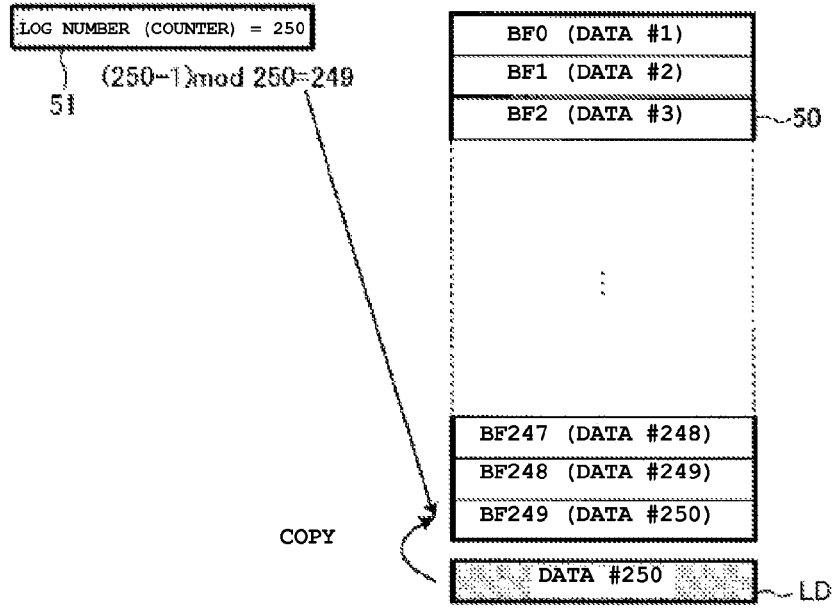
FIGS. 8A and 8B show the state when a 251st error occurs in the ring buffer shown in FIG. 4.
Figure 8B:
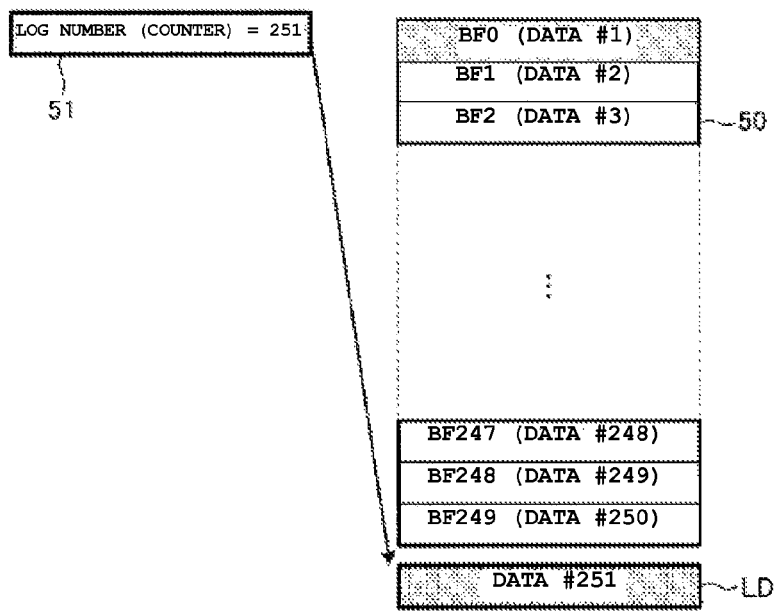

FIGS. 8A and 8B show a recording operation of the 251st log data when the 251st error occurs. The recording operation of these log data is also divided into a first half-process, shown in FIG. 8A, and a second half-process, shown in FIG. 8B. As shown in FIG. 8A, in the first half-process, the log data (data #250) of the log number "250" recorded in the latest log data area LD are copied in the buffer area BF249 of the ring buffer 50. After this copying, the indicator information 51 in which the log number "250" has been recorded, the log data of the buffer area BF249 of the ring buffer 50, and the log data of the latest log data area LD are in a matched state.

In the second half-process, shown in FIG. 8B, the indicator 51 and the latest log data LD are simultaneously updated by the 251st log. In other words, the log number of the indicator 51 is updated to "251," and the log data of the log number "251" to be recorded in the buffer BF0 are recorded in the latest log data area LD. This recording operation of the log data is repeated.

Figure 9:
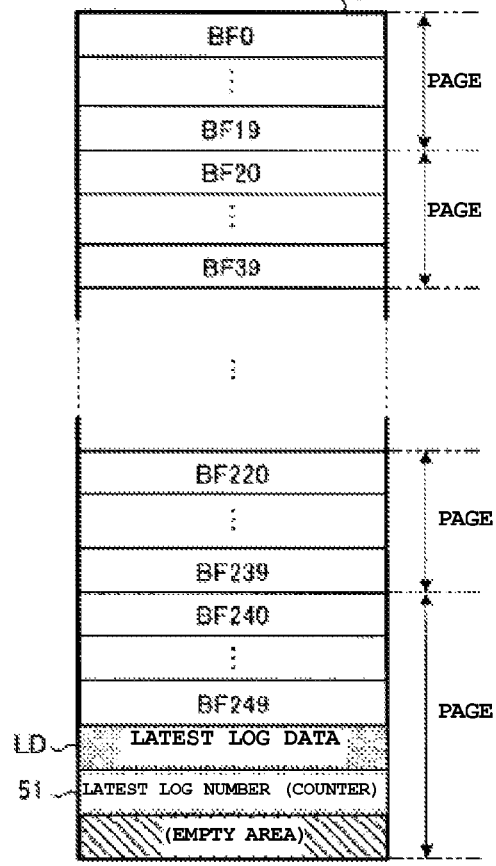
FIG. 9 shows a physical storage arrangement of the ring buffer for recording an error log of the first embodiment.

FIG. 9 shows a physical storage arrangement of the ring buffer 50 for recording an error log in this embodiment. FIG. 9 corresponds to the error log of the logical storage arrangement shown in FIG. 4, and M (=250) pieces of log data at maximum can be recorded by the buffers BF0 to BF249. In this embodiment, it is assumed that one page has a capacity capable of recording N (=20) pieces of log data or indicators. Because 20 pieces of log data are recorded in each page, a ring buffer that can cyclically (circular or cyclic) record 250 pieces of log data using 13 pieces of pages can be constituted. In addition, in the comparative example shown in FIG. 3, the ring buffer that can record 250 pieces of log data using 14 pieces of pages is constituted. Because 10 pieces of log data (buffer BF240 to buffer BF249) may be recorded in the page at the tail of the ring buffer 50, a remainder area corresponding to 10 pieces of log data is generated. Accordingly, in this embodiment, the indicator 51 and the latest log data LD are recorded in this remainder area.

In addition, in this embodiment, each page address (block number+page number) at which the log data have been recorded and the page address at which the indicator 51 and the latest log data LD have been recorded are managed by the error log management information 23 of the RAM 23 shown in FIG. 1. In this embodiment, because the indicator 51 and the latest log data LD are recorded in the remainder area of the page at the tail of the ring buffer 50, the page addresses at which the buffer BF240 to the buffer BF249, the indicator 51, and the latest log data LD are recorded are managed by the same arrangement information 23d (hereinafter, referred to as the "last page arrangement information" and the page at tail of the ring buffer 50 referred to as the "last page").

FIG. 10 shows the initial state (a state in which no error occurs at all) of the ring buffer 50 of the physical composition. In the initial state, in the error log management information 23, a page address (for example, page address=0) is registered only in the last page arrangement information 23d. The other arrangement information of the error log management information 23 is in an invalid state. In addition, in the page with the page address=0, the indicator 51 has an initial value (=0); however, the other areas are in an empty state.

FIG. 11 shows a recording operation of the first log data when the first error occurs. Hereinafter, the page with a page address Y is indicated by page #Y. If the first error occurs, the error log management section 33 prepares a separate page (for example, page address=1), records the indicator 51 showing the log number "1," in the page #1 and records the log data LD (data #1) of the log number "1" to be recorded in the buffer BF0. The error log management section 33 updates the last page arrangement information 23d of the error log management information 23 to the page address=1 along with this recording operation. Because the page #0, which has been used for the last page, is removed from the management of the error log management information 23, it is invalidated.

Figure 12A:
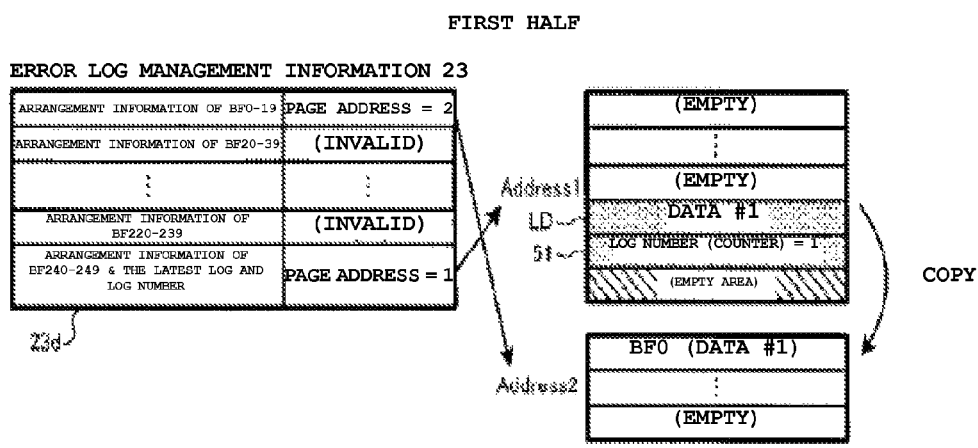
FIGS. 12A and 12B show the state when a 2nd error occurs in the ring buffer shown in FIG. 9.
Figure 12B:
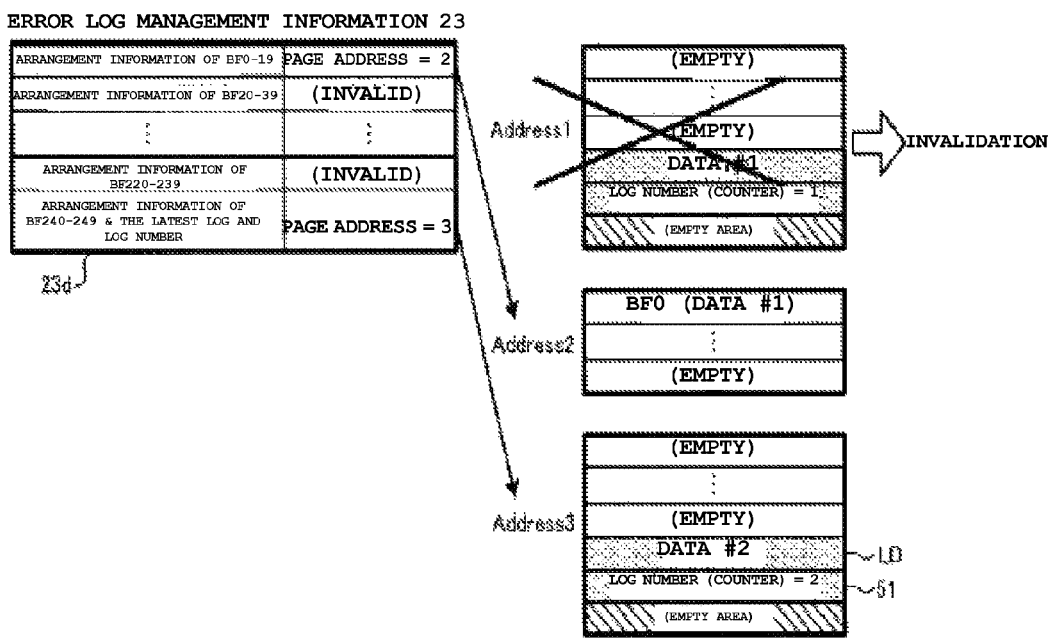

FIGS. 12A and 12B show the recording operation of the second log data when a second error occurs. This recording operation is divided into a first half-process, shown in FIG. 12A, and a second half-process, shown in FIG. 12B. In the first half-process, the error log management section 33 prepares a separate page (for example, page address=2) and copies the log data of the log number "1," which has been recorded in the latest data area LD of the page #1, in the buffer BF0 of the page #2. The error log management section 33 updates the arrangement information of BF0-19 of the error log management information 23 to the page address=2 along with this copy operation.

In the second half-process, shown in FIG. 12B, the error log management section 33 prepares a separate page (for example, page address=3), records the indicator 51 showing the log number "2" on the page #3, and records the log data (data #2) of the log number "2" to be recorded in the buffer BF1 on the latest log data area LD. The error log management section 33 updates the last page arrangement information 23d to the page address=3 along with this recording operation.

Figure 13A:
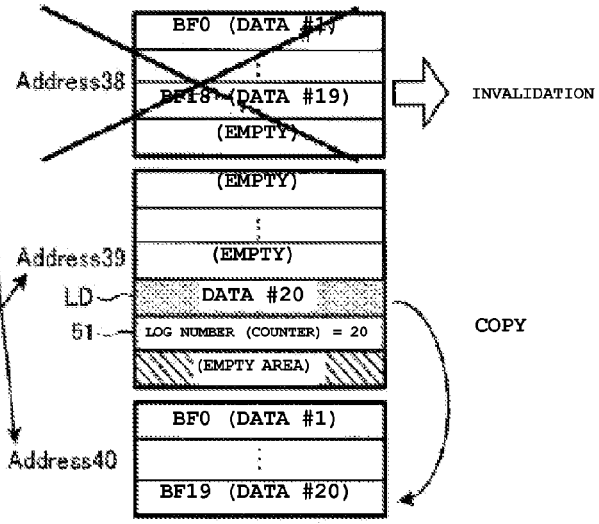
FIGS. 13A and 13B show the state when a 21st error occurs in the ring buffer shown in FIG. 9.
Figure 13B:
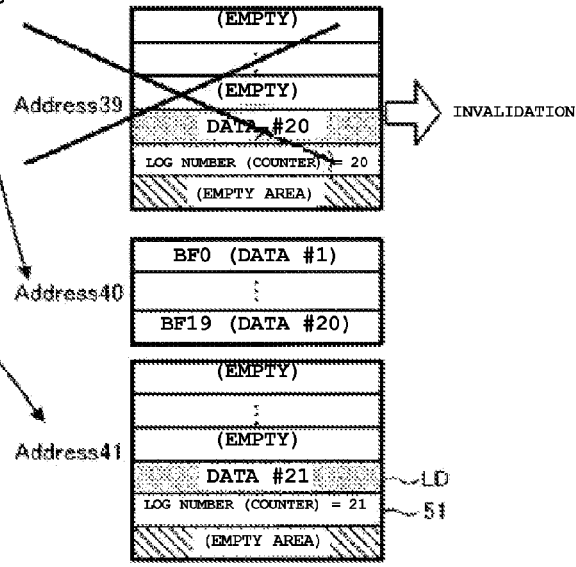

FIGS. 13A and 13B show the recording operation of the 21st log data when a 21st error occurs. This recording operation is also divided into a first half-process, shown in FIG. 13A, and a second half-process, shown in FIG. 13B. As shown in FIG. 13A, in the first half-process, the error log management section 33 copies the data #1 to the data #19, which have been recorded in the buffer BF0 to the buffer BF18 of the page #38, in the buffer BF0 to the buffer BF18 of a separate page (for example, page address=40) and copies the log data (data #20) of the log number "20," which has been recorded in the latest log data area LD of the page #39, in the buffer BF19 of the page #40. The error log management section 33 updates the arrangement information of BF0-19 of the error log management information 23 to the page address=40 along with this copy operation.

In the second half-process, shown in FIG. 13B, the error log management section 33 prepares a separate page (for example, page address=41), records the indicator 51 showing the log number "21" on the page #41, and records the log data of the log number "21" to be recorded in the buffer BF20 on the latest log data area LD. The error log management section 33 updates the last page arrangement information 23d to the page address 41 from the page address 39 along with this recording operation.

Figure 14:
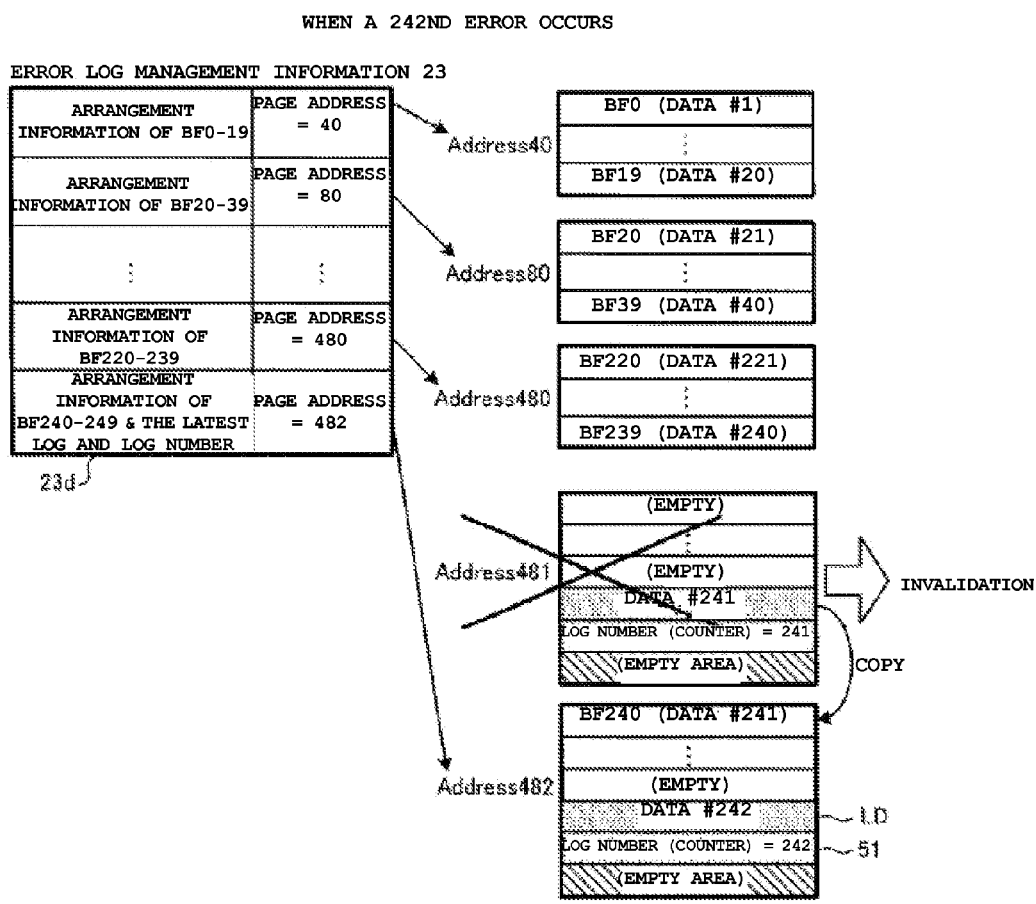
FIG. 14 shows the state when a 242nd error occurs in the ring buffer shown in FIG. 9.

FIG. 14 shows the recording operation of the 242nd log data when a 242nd error occurs. This recording operation is not divided into a first half-process and a second half-process, but rather it is simultaneously carried out. As shown in FIG. 14, before the 242nd error occurs, the indicator 51 showing the log number "241" is recorded on the page #481, and the log data (data #241) of the log number "241" to be recorded in the buffer BF240 are recorded on the latest log data area LD. In this embodiment, as shown in FIG. 9, the data #241 to the data #250 to be recorded in the buffers BF240-BF249 are recorded on the same page as the page in which the latest log data area LD and the indicator 51 are arranged.

For this reason, if a 242nd error occurs, the error log management section 33 prepares a separate page (for example, page address=482), copies the log data that have been recorded in the latest log data area LD of the page #481 in the buffer BF240 of the page #482, records the indicator 51 showing the log number "242" on the page #482, and records the log data (data #242) of the log number "242" to be recorded in the buffer BF241. The error log management section 33 updates the last page arrangement information 23d of the error log management information 23 to the page address 482 from the page address 481 along with this recording operation. As a result, the page #481 is invalidated.

Figure 15:
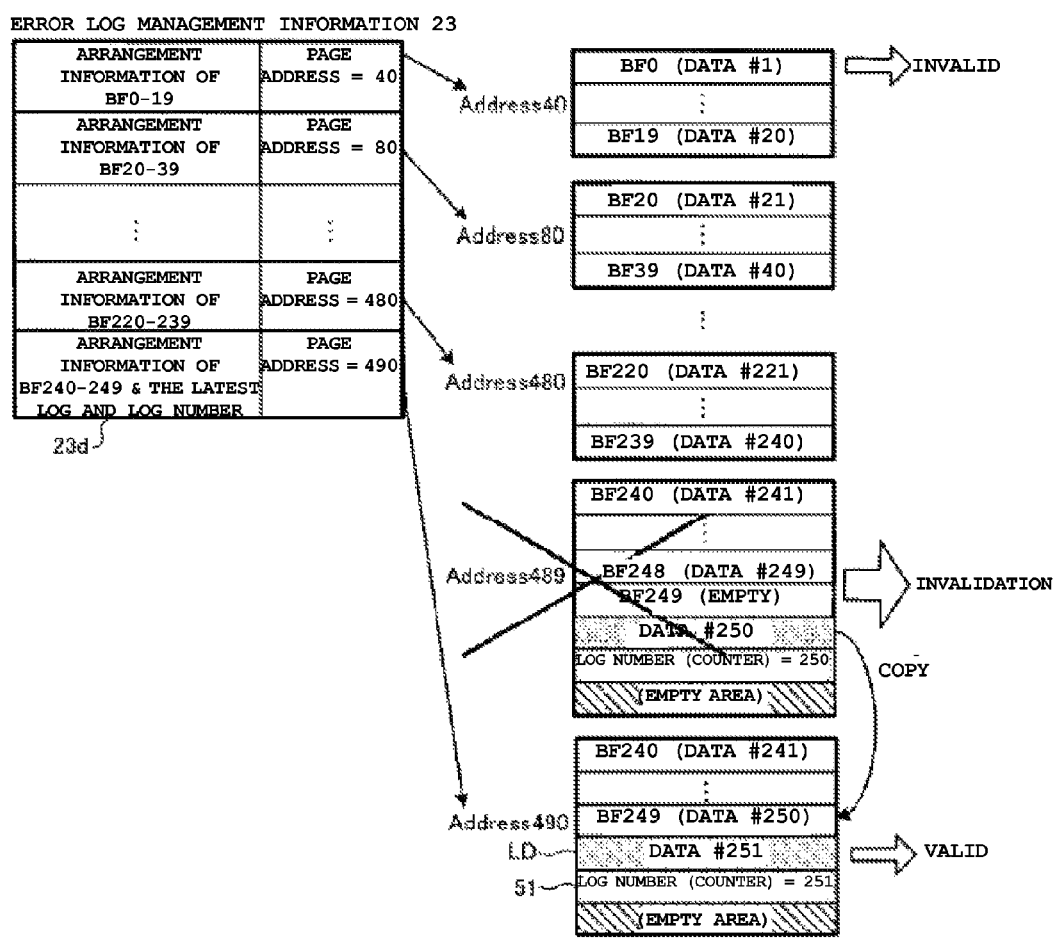
FIG. 15 shows the state when a 251st error occurs in the ring buffer shown in FIG. 9.

FIG. 15 shows a recording operation of the 251st log data when a 251st error occurs. This recording operation is not divided into a first half-process and a second half-process, but rather it is simultaneously carried out. As shown in FIG. 15, before a 251st error occurs, the data #1 to the data #240 are recorded in the buffers BF0-BF239, the data #241 to the data #249 are recorded in the buffers BF240-BF248 of the page #489, and only the buffer BF249 is empty. In addition, the log number "250" is recorded in the indicator 51 of the page #489, and the log data (#250) of the log number "250" to be recorded in the buffer BF249 are recorded on the latest log data area LD.

If a 251st error occurs, the error log management section 33 prepares a separate page (for example, page address=490), copies the log data of the log numbers "241" to "249" that have been recorded in the buffers BF240-BF248 of the page #489 in the buffers BF240-BF248 of the page #490 and further copies the data #250 that have been recorded in the latest log data area LD of the page #489 in the buffer BF249 of the page #490. In addition, the error log management section 33 records the indicator 51 showing the log number "251" on the page #490 and records the log data LD (data #251) of the log number "251" to be recorded in the buffer BF0. The error log management section 33 updates the last page arrangement information 23d of the error log management information 23 to the page address 490 from the page address 489 along with this recording operation. As a result, the page #489 is invalidated. Moreover, the data #1, which have been recorded in the buffer BF0, is invalidated by the data #251 to be recorded in the buffer BF0.

Figure 16:
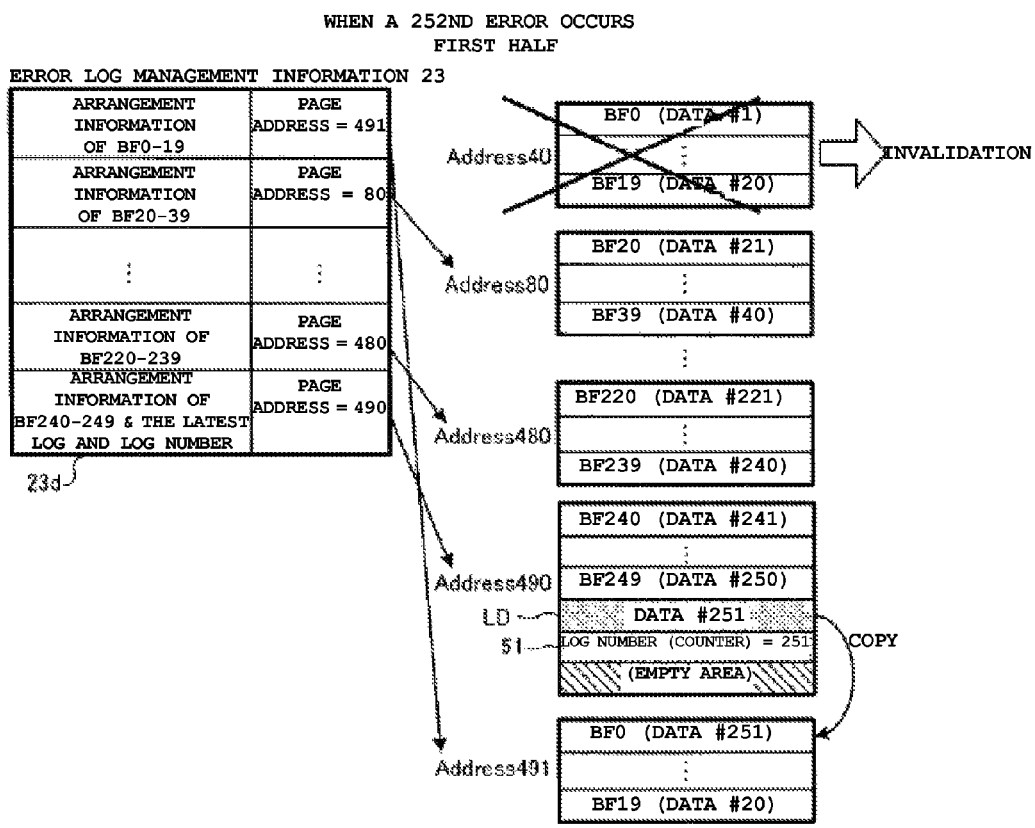
FIG. 16 shows the state after the first half-process is executed when a 252nd error occurs in the ring buffer shown in FIG. 9.

FIG. 16 shows a recording operation of the 252nd log data when a 252nd error occurs. This recording operation is divided into a first half-process, shown in FIG. 16, and a second half-process shown in FIG. 17. As shown in FIG. 16, in the first half-process, the error log management section 33 copies the data #251, which have been recorded in the latest log data area LD of the page #490, in the buffer BF0 to a separate page (for example, page address=491). In addition, the error log management section 33 copies the data #2 to the data #20, which have been recorded in the buffers BF1-BF19 of the page #40, in the buffers BF1-BF19 of the page #491. The error log management section 33 updates the arrangement information of BF0-19 of the error log management information 23 to the page address=491 from the page address=40 along with this copy operation.

Figure 17:
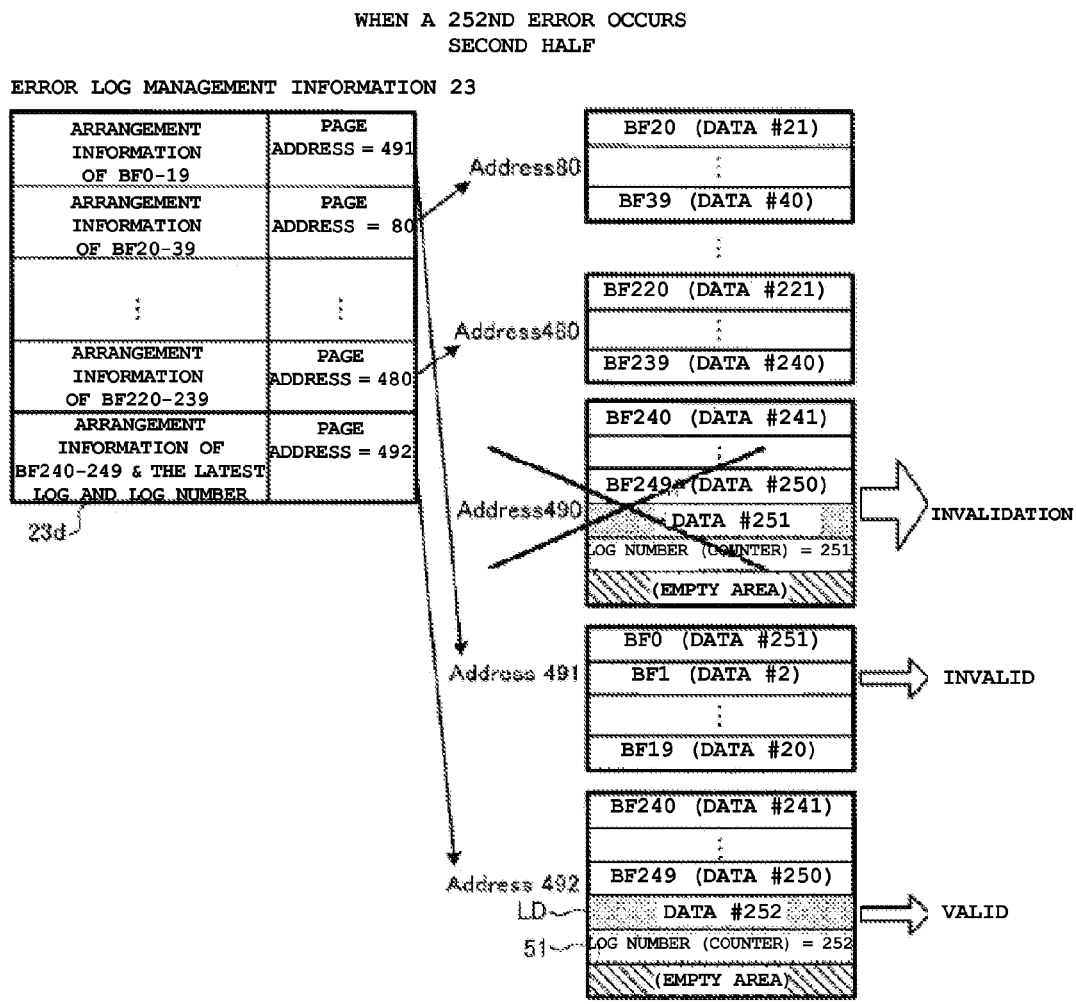
FIG. 17 shows the state after the second half-process is executed when a 252nd error occurs in the ring buffer shown in FIG. 9.

In the second half-process shown in FIG. 17, the error log management section 33 prepares a separate page (for example, page #492), records the indicator 51 showing the log number "252" on the page #492 and records the data #252 to be recorded in the buffer BF1 on the latest log data area LD. In addition, the data #241 to the data #250, which have been recorded in the buffers BF240-BF249 of the page #490, are copied in the buffers BF240-BF249 of the page #492. The error log management section 33 updates the last page arrangement information 23d of the error log management information 23 to the page address 492 from the page address 490 along with this recording operation. Each time an error occurs, this log-recording operation is repeatedly performed.

Therefore, in this embodiment, because indicator information is recorded in a remainder area of the page at the tail of the ring buffer 50, only the log data need to be and are actually recorded in the other pages constituting the ring buffer 50. And because the indicator information is not recorded in the other pages, the number of pages constituting the ring buffer 50 can be reduced; thus, the log data can be stored and recorded with good efficiency in the NAND 10 using a small storage area. In addition, because only one indicator information 51 may be read out to detect the latest data, the initialization processing time (starting time) after a power input can be shortened.

In addition, in this embodiment, an area where the latest log data LD (latest data) and the latest indicator information 51 are recorded is installed in the remainder area of the page at the tail of the ring buffer. In the first half-process, the previous log data LD is copied in a prescribed buffer corresponding to the log number in the ring buffer from the remainder area of the last page, and in the second half-process, the indicator information and the latest log data LD in the remainder area of the last page are simultaneously updated according to the current log. Therefore, because the latest indicator information and the latest log data LD are simultaneously recorded in the same page, even if an unexpected power-off occurs at a certain point in time, the latest log data or one previous log data from the latest log data and the log number are recorded in a matched state in the area LD with the indicator 51 of the remainder area; thus the log can be managed without causing mismatching in the log data section and the indicator section, even if the power is unexpectedly cut off.

Figure 18:
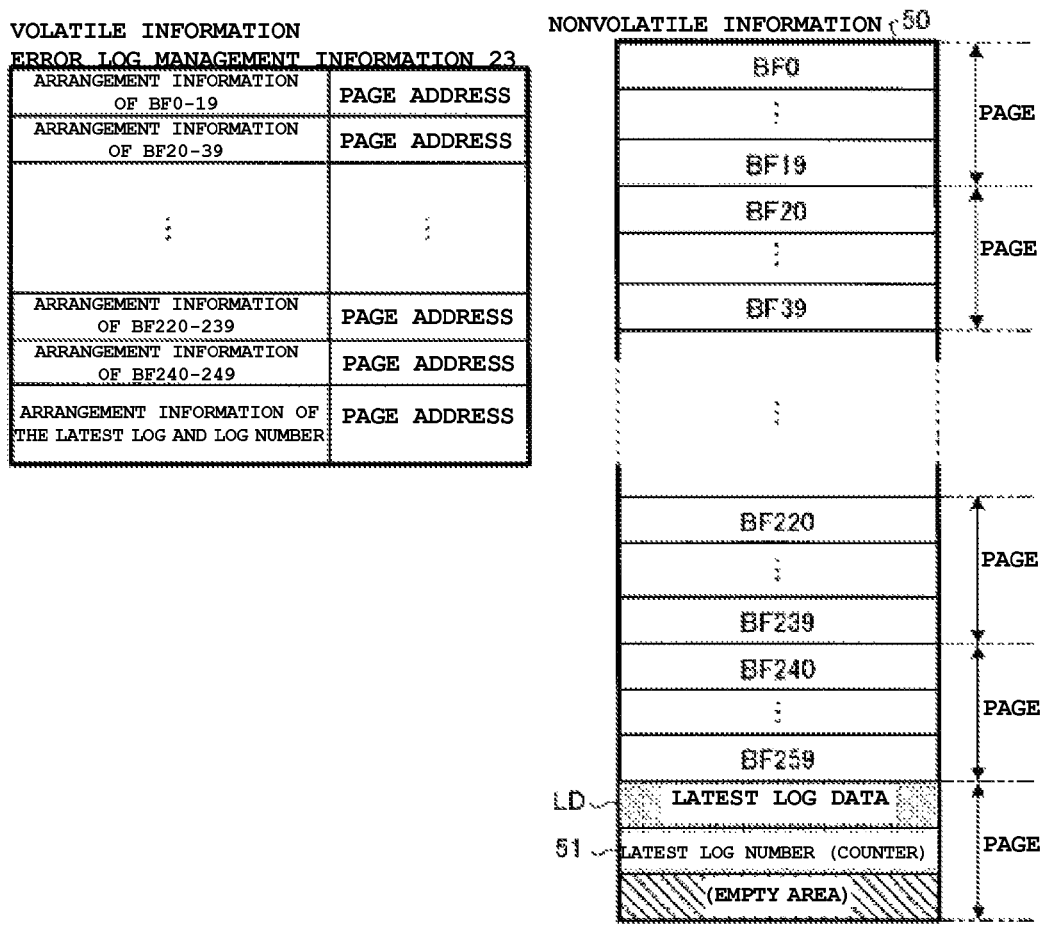
FIG. 18 shows an example of another ring buffer.

Here, in the embodiment, the latest log data LD and the latest indicator information 51 have been recorded in the remainder area of the page at the tail of the ring buffer; however, at times no remainder area exists in the last page in accordance with the relationship between the maximum number of recording of the log data and the page capacity. In this case, as shown in FIG. 18, a dedicated page for recording only the latest log data LD and the latest indicator information 51 may be installed. In FIG. 18, the ring buffer 50 includes 260 pieces of buffer of the buffers BF0-BF259, and the latest log data LD and the latest indicator information 51 are recorded in a separate dedicated page. Even in this case, the latest log data LD and the latest indicator information 51 on the dedicated page are always simultaneously updated. In addition, similarly to the previous embodiment, the log-recording operation is separated into a process for copying the latest log data LD in the ring buffer area and a process for updating the latest log data LD and the latest indicator information 51. Needless to say, even in a dedicated page, each time the latest log data LD and the latest indicator information 51 are updated, the page for recording the latest log data LD and the latest indicator information 51 is changed.

Second Embodiment

Figure 19A:
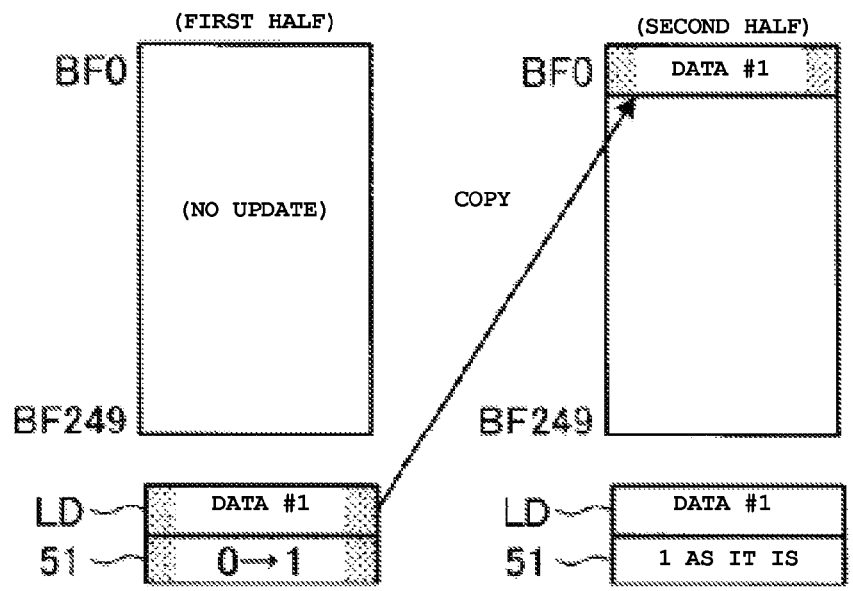
FIGS. 19A and 19B show a log-recording operation according to a second embodiment.
Figure 19B:
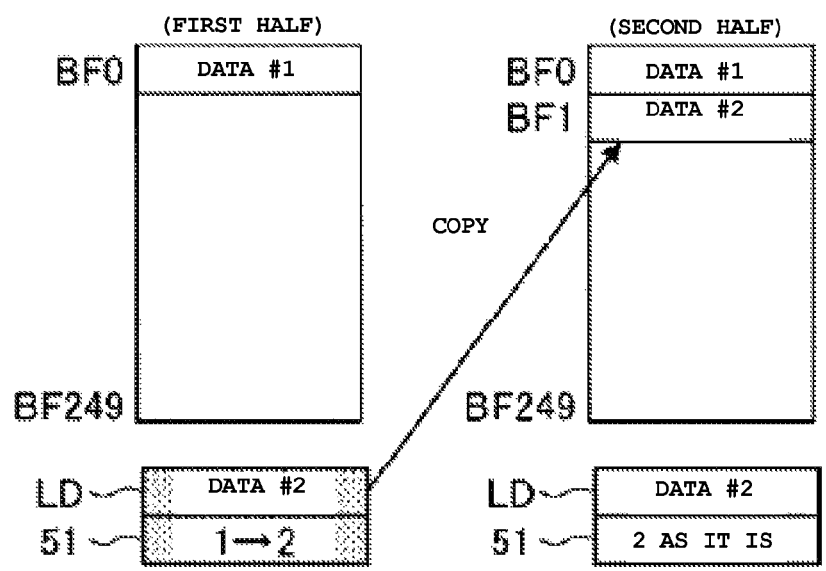

In the second embodiment, when an error occurs, the latest log data LD and the latest indicator information 51 are updated in a first half-process, and the latest log data LD is copied in a prescribed buffer corresponding to the log number in the ring buffer in a second half-process. FIGS. 19A and 19B show a recording operation of an error log of the second embodiment.

The latest log data LD and the latest indicator information 51, as mentioned above, may be arranged in a remainder area of the last page or may also be arranged in a dedicated page. When the first error occurs, in the first half-process the error log management section 33, as shown in FIG. 19A, updates the latest log data area LD by the data #1 and then updates the log number of the indicator 51 to "1" from "0." If this first half-process is finished, the error log management section 33 copies the data #1 recorded in the latest log data area LD in the buffer area BF0 of the ring buffer. After this copy, the indicator information 51 in which the log number "1" has been recorded, the log data of the buffer region BF0 of the ring buffer 50, and the log data of the newest log data area LD are in a matched state.

When a second error occurs, in the first half-process, the error log management section 33, as shown in FIG. 19B, updates the latest log data area LD and then updates the log number of the indicator 51 to "2" from "1." If this first half-process is finished, the error log management section 33 copies the data #2 recorded in the latest log data area LD in the buffer area BF1 of the ring buffer. After this copying, the indicator information 51 in which the log number "2" has been recorded, the log data of the buffer region BF1 of the ring buffer 50, and the log data of the latest log data area LD are in a matched state. This process is repeated.

In the second embodiment, similarly to the first embodiment, because the latest log data and log number are recorded in a matched state in the latest log data area LD with the indicator 51, even if an unexpected power-off occurs, the log can be managed without causing mismatching in the log data section and the indicator section. However, in the second embodiment, in the case that an unexpected power cut-off occurs after the start of the first half-process but before the end of the second half-process, it cannot be assured that the data in the latest log data area LD are copied in the buffer area corresponding to the log number that is designated by the indicator information 51 in the ring buffer. Therefore, whether the log data in the latest log data area LD and the data of the buffer area corresponding to the log number that is designated by the indicator information 51 are the same or not is checked, and if they are not the same data, the second half-process is re-performed.

Here, given management information that is managed in the ring buffer of this embodiment, any management information that is required to be recorded in a nonvolatile fashion other than the error information may be adopted. For example, statistical information (temperature information, electrification time, and access times such as readout or write) of the SSD 100 may also be adopted as the management information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A semiconductor memory device, comprising:
    a nonvolatile semiconductor memory in which writing is carried out at a page unit and erasing is carried out at a block unit larger than the page unit; and
    a controller for controlling data transfer between a host device and the nonvolatile semiconductor memory, the controller including a log-management section that is configured to update a log buffer that stores data about monitored events in a plurality of pages of the nonvolatile semiconductor memory and a log data structure that stores addresses of the pages of the nonvolatile semiconductor memory that are part of the log buffer, by performing the steps of: (i) determining an address of a page of the log buffer in which latest log data is stored, the latest log data including a first part and a second part; (ii) reading the latest log data from the page at the determined address and copying the first part of the latest log data into a first page of the nonvolatile semiconductor memory; (iii) updating the first and second parts of the latest log data and storing the updated latest log data in a second page of the nonvolatile semiconductor memory, wherein the first part of the updated latest log data includes data about a latest monitored event and the second part of the updated latest log data includes a log number associated with the latest monitored event; and (iv) updating the log data structure to store addresses of the first and second pages and to identify the second page as storing the latest log data.

2. The semiconductor memory device of claim 1, wherein the log number is updated each time the monitored event occurs.

3. The semiconductor memory device of claim 2, wherein the controller, prior to copying the first part of the latest log data into the first page, determines an address of another page of the log buffer using the second part of the latest log data, and combines contents of the another page with the first part of the latest log data, such that the combined contents are copied into the first page.

4. The semiconductor memory device of claim 3, wherein the controller is configured to copy the first part of the latest log data into the first page upon occurrence of the monitored event.

5. The semiconductor memory device of claim 3, wherein the controller is configured to copy the first part of the latest log data into the first page prior to occurrence of the monitored event.

6. The semiconductor memory device of claim 3, wherein the address of the page of the log buffer storing the latest log data is determined from the log data structure.

7. The semiconductor memory device of claim 1, wherein the monitored event is an error.

8. A method of recording log data in a log buffer that includes a plurality of pages of a nonvolatile semiconductor memory in which writing is carried out at a page unit and erasing is carried out at a block unit larger than the page unit, said method comprising:

determining an address of a page of the log buffer in which latest log data is stored, the latest log data including a first part and a second part;

reading the latest log data from the page at the determined address and copying the first part of the latest log data into a first page of the nonvolatile semiconductor memory;

updating the first and second parts of the latest log data and storing the updated latest log data in a second page of the nonvolatile semiconductor memory, wherein the first part of the updated latest log data includes data about a latest monitored event and the second part of the updated latest log data includes a log number associated with the latest monitored event; and adding addresses of the first and second pages to a log data structure that stores addresses of the pages of the nonvolatile semiconductor memory that are part of the log buffer, the log data structure identifying the second page as a page storing the latest log data.

9. The method of claim 8, wherein the log number is updated each time the monitored event occurs.

10. The method of claim 9, further comprising:

prior to said copying, determining an address of another page of the log buffer using the second part of the latest log data, and combining contents of the another page with the first part of the latest log data, such that the combined contents are copied into the first page.

11. The method of claim 10, wherein said copying is carried out upon occurrence of the monitored event.

12. The method of claim 10, wherein said copying is carried out prior to occurrence of the monitored event.

13. The method of claim 10, wherein the address of the page of the log buffer storing the latest log data is determined from the log data structure.

14. The method of claim 8, wherein the monitored event is an error.

* * * * *